UNITED STATES PATENT OFFICE.

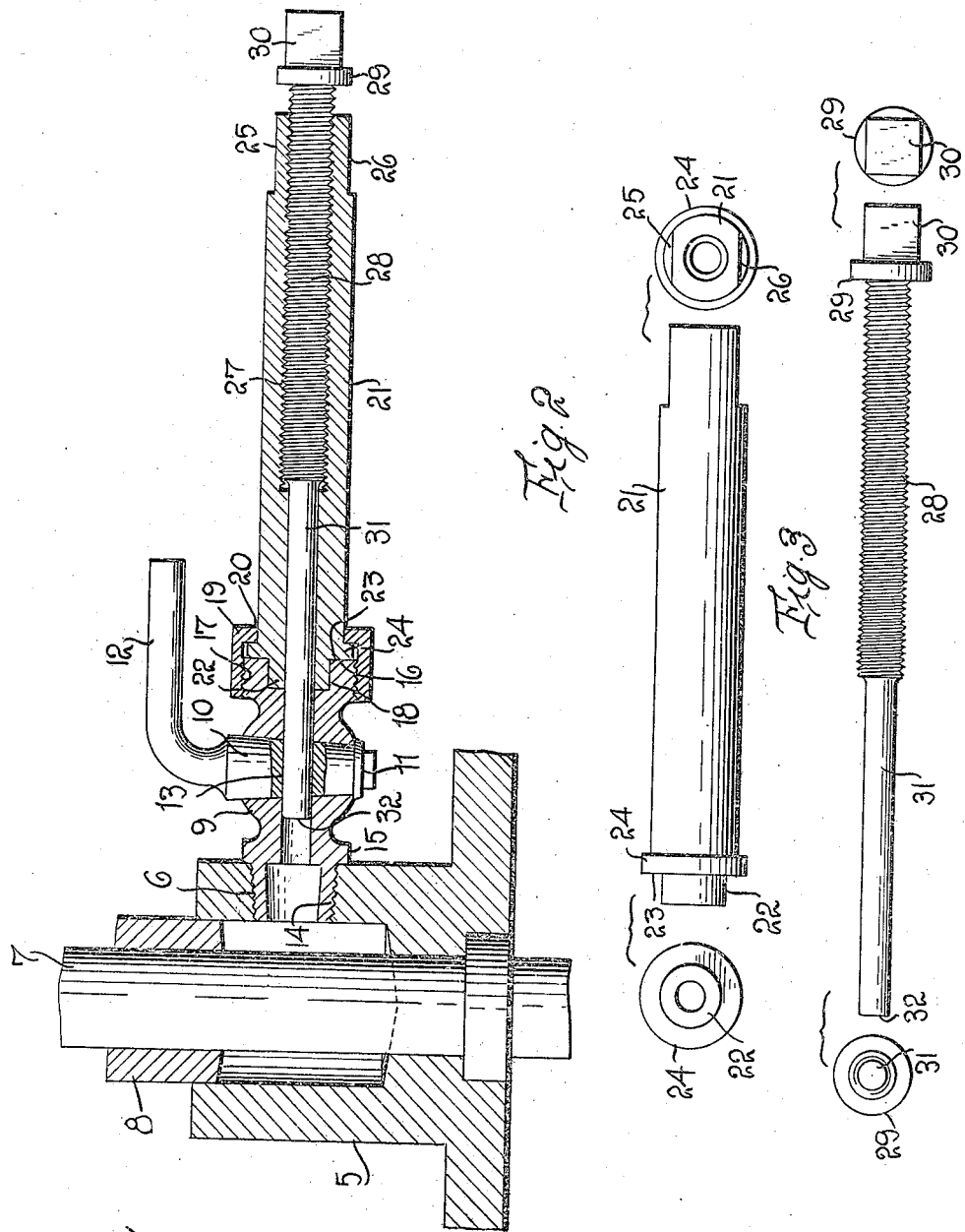
W. G. BLEY.
MEANS FOR PACKING STUFFING BOXES.
APPLICATION FILED MAY 24, 1916.
1,243,917. Patented Oct. 23, 1917.
Inventor
WILLIAM G. BLEY
By Watson E. Coleman
Attorney

WILLIAM G. BLEY, OF CINCINNATI, OHIO.

MEANS FOR PACKING STUFFING-BOXES.

1,243,917.  Specification of Letters Patent.  Patented Oct. 23, 1917.

Application filed May 24, 1916. Serial No. 99,637.

*To all whom it may concern:*

Be it known that I, WILLIAM G. BLEY, a citizen of the United States, residing at Cincinnati, in the county of Hamilton and State of Ohio, have invented certain new and useful Improvements in Means for Packing Stuffing-Boxes, of which the following is a specification, reference being had to the accompanying drawings.

This invention relates to means for packing stuffing boxes, and particularly to means for packing the stuffing boxes of valves or like devices, wherein, if the packing be defective, steam, or other fluid, under pressure, will escape around the valve stem or will escape if the gland through which the valve stem passes be removed for re-stuffing the packing.

It is usual, under the conditions named, to close the valve or cut off the supply of fluid entirely, then remove the nut of the stuffing box, whereupon the old packing may be removed and new packing replaced, whereupon the valve is again turned to permit fluid to pass. This operation causes delay and causes the shutting down of machinery operated by the steam or other fluid pressure controlled by the valve. It is, therefore, advisable to provide means for repacking these stuffing boxes, without the necessity of shutting the valve or cutting off the supply of fluid under pressure, and this is the main object of my invention.

A further object is to provide in connection with the stuffing box, a valve body opening into the stuffing box and provided with a valve, which may be turned to cut off communication through the bore of the valve body or permit passage through said bore and provide in connection with the valve body, a detachable barrel in which a plunger operates, which barrel may be filled with packing attached to the valve body and then the plunger operated to force the packing into the gland, the valve being opened to permit the passage of the plunger and packing, and closed when the plunger is again withdrawn.

A further object is to provide a construction of this kind, in which the plunger does not need to be withdrawn, unless it is desired to repack the valve.

A further object is to provide a device of this character, which is very simple in construction, cheaply made, and which may be very readily operated.

The invention is illustrated in the accompanying drawings.

Figure 1 is a longitudinal sectional view of the device attached to the stuffing box;

Fig. 2 is a side elevation of the barrel with detached end views;

Fig. 3 is a side elevation of the plunger with detached end views.

The stuffing box 5 has one of its walls provided with a transverse hole which is screw-threaded at 6. It is preferred to bore this hole substantially mid-way of the ends of the box so that the portions around the rod 7 may be reached.

Coacting with the stuffing box 5 is a valve body 9 having a longitudinally extending bore, passage through which is controlled by a rotatable valve 10 which may be in the form of a barrel valve or turn cock, held in place by the usual nut 11 and having a handle 12. This barrel 10 has a diametrically extending passage 13 which in one position of the valve is adapted to register with the bore of the valve body 9.

One end of the valve body 9 has a tapered screw-threaded head 14 adapted to engage in the tapering screw-threaded opening 6 in the wall of the stuffing box. The valve body is also provided with the shoulder 15 to bear against the stuffing box. At its opposite end the valve body is formed with a head 16 exteriorly screw-threaded as at 17 and the end face of this head is formed with a central recess 18.

Engaging the screw threads 17 is a coupling 19 having an inturned flange 20.

Coacting with the valve body 9 and with the coupling 19 is a barrel 21 which has a longitudinally extending bore. The forward portion of this bore is relatively reduced in diameter and the rear portion of the bore is screw-threaded as at 27. The forward end of the barrel has a reduced portion 22 adapted to be inserted within the recess 18 and rearward of this reduced portion the barrel is formed with the outwardly extending flange 24 adapted to be engaged by the inwardly turned flange 20 of the coupling 19, so that the barrel 21 may be drawn into snug engagement with the end of the valve body. At its opposite end the valve 21 has the oppositely disposed parallel faces 25, 26 which permit a wrench to be applied to the barrel. Operating within the bore of the barrel is a plunger, the rear portion of which is of a diameter sufficient to fit the enlarged portion of the bore of the barrel and screw-threaded as at 28 to engage the screw-threads 27. The forward portion of the plunger is reduced in diameter and fits snugly the forward portion of the barrel and the aperture 13 in the valve 10 of the valve body. At its rear end this plunger is provided with an annular flange 29 and with a many sided head 30, whereby a wrench may be applied.

In the practical operation of this invention, it will be understood that the valve body is ordinarily carried by the stuffing box 5 in the manner illustrated and forms a permanent part of this stuffing box. The barrel 21, with the plunger, may or may not be normally attached to the valve body 9. Ordinarily, however, it will not be so attached. Normally the valve 10 is turned so as to close the passage through the bore of the valve body. Now when the packing within the stuffing box becomes defective and it is desired to repack the stuffing box, the plunger is withdrawn to its full extent from the barrel 21 and the forward portion of the barrel 21 is filled with packing. The barrel 21 is then connected to the valve body 9, by means of the coupling 19, and then the valve 10 is opened. It will be seen that no pressure can escape for the reason that the plunger 31 fully fills the bore of the valve body and the forward portion of the barrel so that the barrel 10 may be opened with impunity. When the valve 10 is opened the plunger is rotated to force the packing in front of the plunger forward into the stuffing box and when the stuffing box has been fully repacked, the valve 10 is rotated to close the passage through the valve body, thus again holding the pressure, it being, of course, understood that the plunger is withdrawn before the valve is closed. The packing which is used may be of any suitable character as, for instance, shredded metallic packing or asbestos wick. After the valve 10 has been turned the barrel 21 may be released from its engagement with the valve body and the barrel 21 and the plunger may be used for repacking another valve or the barrel 21 and its plunger may be kept upon the valve body with the forward end of the barrel filled with packing and then the packing may be forced into the stuffing box from time to time as necessity requires until all the packing within the barrel has been exhausted, when the valve may be turned to close the passage from the valve body and the barrel 21 be again filled with packing.

Minor changes in the form and details of construction may be resorted to without departing from the spirit of my invention or the scope of the appended claims.

Having described this invention, what is claimed is:—

1. The combination with a stuffing box, of a valve body having a bore extending into the stuffing box, a valve controlling passage through said bore, a barrel having fluid-tight engagement with the end of the valve body, and a plunger operating within the barrel and having its forward end formed to fit and pass through the bore of the valve body when the valve is turned to open passage through the body.

2. The combination with a stuffing box, of a valve body having a longitudinally extending bore opening into the stuffing box and having an apertured valve shiftable to establish or cut off communication through said bore, a barrel detachably engaged with the outer end of the valve body, and a plunger mounted in said barrel and having its forward end formed to fit the bore of the valve body and the aperture in the valve.

3. The combination with a stuffing box, of a valve body having a longitudinally extending bore opening into the stuffing box, a rotatable valve mounted in the valve body and having a diametrically extending aperture registering with the bore when the valve is turned in one direction, a barrel, a plunger mounted in the barrel and having its forward end formed to fit said bore and said aperture, and a coupling detachably connecting one end of the barrel to the valve body.

4. The combination with a stuffing box, of a valve body having a longitudinal passage opening into the interior of the stuffing box, an apertured valve controlling said passage, said aperture having a diameter equal to the diameter of the longitudinal passage, a barrel operatively connected to and extending from the outer end of the valve body and having a bore, the outer end of said bore having an increased diameter and being screw-threaded, and a plunger having its forward portion reduced to fit the unthreaded portion of the bore of the barrel, the longitudinal passage in the valve body and said aperture, the outer portion of the plunger being screw-threaded and engaging the screw-threaded portion of the bore of the barrel.

5. As an article of manufacture, a stuffing box packing device comprising a valve body having a screw-threaded extremity for engagement with the wall of the stuffing box and having a longitudinally extending bore, an apertured valve controlling passage through said bore, a barrel operatively connected to one end of the valve body and having a bore of the same size as the bore of the valve body, and a plunger fitting the bore of the barrel and of the valve body and having screw-threaded engagement with the barrel.

In testimony whereof I hereunto affix my signature in the presence of two witnesses.

WILLIAM G. BLEY.

Witnesses:
JOSEPH B. SCHROEDER,
CHARLES SAWYER.

Copies of this patent may be obtained for five cents each, by addressing the "Commissioner of Patents, Washington, D. C."